(12) United States Patent
Vorbach et al.

(10) Patent No.: US 10,331,194 B2
(45) Date of Patent: Jun. 25, 2019

(54) METHODS AND DEVICES FOR TREATING AND PROCESSING DATA

(71) Applicant: Scientia Sol Mentis AG, Schindellegi (CH)

(72) Inventors: Martin Vorbach, Munich (DE); Volker Baumgarte, Munich (DE)

(73) Assignee: PACT XPP Schweiz AG, Schindellegi (CH)

(*) Notice: Subject to any disclaimer, the term of this patent is extended or adjusted under 35 U.S.C. 154(b) by 0 days.

(21) Appl. No.: 15/408,358

(22) Filed: Jan. 17, 2017

(65) Prior Publication Data

US 2017/0192481 A1  Jul. 6, 2017

Related U.S. Application Data

(60) Continuation of application No. 14/219,945, filed on Mar. 19, 2014, now Pat. No. 9,552,047, which is a (Continued)

(30) Foreign Application Priority Data

| Mar. 5, 2001 | (DE) | 101 10 530 |
| Mar. 7, 2001 | (DE) | 101 11 014 |
| Jun. 20, 2001 | (EP) | 1115021 |
| Jul. 24, 2001 | (DE) | 101 29 237 |
| Jul. 24, 2001 | (DE) | 101 35 210 |
| Jul. 24, 2001 | (DE) | 101 35 211 |
| Jul. 24, 2001 | (WO) | PCT/EP01/06703 |
| Jul. 24, 2001 | (WO) | PCT/EP01/08534 |
| Aug. 16, 2001 | (DE) | 101 39 170 |
| Aug. 29, 2001 | (DE) | 101 42 231 |
| Sep. 3, 2001 | (DE) | 101 42 894 |
| Sep. 3, 2001 | (DE) | 101 42 904 |
| Sep. 11, 2001 | (DE) | 101 44 732 |
| Sep. 11, 2001 | (DE) | 101 44 733 |

(Continued)

(51) Int. Cl.
*G06F 1/324* (2019.01)
*G06F 1/3203* (2019.01)
(Continued)

(52) U.S. Cl.
CPC .......... *G06F 1/324* (2013.01); *G06F 1/3203* (2013.01); *G06F 1/3237* (2013.01); *Y02D 10/126* (2018.01); *Y02D 10/128* (2018.01)

(58) Field of Classification Search
CPC ...... G06F 1/324; G06F 1/3203; G06F 1/3237; Y02D 10/126; Y02D 10/128
See application file for complete search history.

(56) References Cited

U.S. PATENT DOCUMENTS 5,502,838 A * 3/1996 Kikinis ............. G05D 23/1919
713/501
5,870,595 A * 2/1999 Oki ....................... G06F 1/3228
713/601

(Continued)

*Primary Examiner* — Abdelmoniem I Elamin
(74) *Attorney, Agent, or Firm* — Aaron Grunberger (57) ABSTRACT

A method of clocking a plurality of programmable, sequential data processing units, by adjusting the clock frequency of at least one of the programmable, sequential data processing units, without affecting the clock frequency of at least one other of the programmable, sequential data processing units.

16 Claims, 7 Drawing Sheets

Related U.S. Application Data division of application No. 13/653,639, filed on Oct. 17, 2012, now Pat. No. 9,075,605, which is a continuation of application No. 12/570,984, filed on Sep. 30, 2009, now Pat. No. 8,312,301, which is a continuation of application No. 12/257,075, filed on Oct. 23, 2008, now Pat. No. 8,099,618, which is a division of application No. 10/469,909, filed as application No. PCT/EP02/02402 on Mar. 5, 2002, now Pat. No. 7,444,531.

(30) Foreign Application Priority Data

| Sep. 17, 2001 | (DE) | 101 45 792 |
| Sep. 17, 2001 | (DE) | 101 45 795 |
| Sep. 19, 2001 | (DE) | 101 46 132 |
| Sep. 30, 2001 | (WO) | PCT/EP01/11299 |
| Sep. 30, 2001 | (WO) | PCT/EP01/11593 |
| Nov. 5, 2001 | (DE) | 101 54 259 |
| Nov. 5, 2001 | (DE) | 101 54 260 |
| Dec. 14, 2001 | (EP) | 01129923 |
| Jan. 18, 2002 | (EP) | 2001331 |
| Jan. 19, 2002 | (DE) | 102 02 044 |
| Jan. 20, 2002 | (DE) | 102 02 175 |
| Feb. 15, 2002 | (DE) | 102 06 653 |
| Feb. 18, 2002 | (DE) | 102 06 856 |
| Feb. 18, 2002 | (DE) | 102 06 857 |
| Feb. 21, 2002 | (DE) | 102 07 224 |
| Feb. 21, 2002 | (DE) | 102 07 225 |
| Feb. 21, 2002 | (DE) | 102 07 226 |
| Feb. 27, 2002 | (DE) | 102 08 434 |
| Feb. 27, 2002 | (DE) | 102 08 435 |

(51) Int. Cl.
*G06F 1/3237* (2019.01)
*G06F 1/32* (2019.01)

(56) References Cited

U.S. PATENT DOCUMENTS

| 6,047,248 | A | 4/2000 | Georgiou et al. |
| 6,501,999 | B1 | 12/2002 | Cai |
| 7,966,511 | B2 | 6/2011 | Naveh et al. |
| 9,552,047 | B2* | 1/2017 | Vorbach ............... G06F 1/206 |
| 2001/0021217 | A1 | 9/2001 | Gunther et al. |
| 2002/0175839 | A1* | 11/2002 | Frey ..................... G06F 1/10 |
| | | | 341/50 |

* cited by examiner

| | | | | | |
|---|---|---|---|---|---|
| I/O | | | 8 Mhz | 2 | 1 |
| + | clk | 32 | 8 Mhz | 4 | 1 |
| / | 32 clk | 1 | 256 Mhz | 128 | 32 |
| loop 16 | 16 clk | 2 | 128 Mhz | 64 | 16 |
| * | 2 clk | 16 | 16 Mhz | 8 | 32 |
| - | clk | 32 | 8 Mhz | 4 | 1 |
| + | clk | 32 | 8 Mhz | 4 | 1 |

Fig. 3b

| 0301 | | |
|---|---|---|
| 0102a I/O | 0102d + | 0102g loop+ |
| 0102b n.c. | 0102e - | 0102h / |
| 0102c n.c. | 0102f * | 0102i + |

METHODS AND DEVICES FOR TREATING AND PROCESSING DATA

FIELD OF THE INVENTION

The present invention relates to optimization of hardware used in data processing.

BACKGROUND INFORMATION

Data processing requires the optimization of the available resources, as well as the power consumption of the circuits involved in data processing. This is the case in particular when reconfigurable processors are used.

Reconfigurable architecture includes modules (VPU) having a configurable function and/or interconnection, in particular integrated modules having a plurality of unidimensionally or multidimensionally positioned arithmetic and/or logic and/or analog and/or storage and/or internally/externally interconnecting modules, which are connected to one another either directly or via a bus system.

These generic modules include in particular systolic arrays, neural networks, multiprocessor systems, processors having a plurality of arithmetic units and/or logic cells and/or communication/peripheral cells (IO), interconnecting and networking modules such as crossbar switches, as well as known modules of the type FPGA, DPGA, Chameleon, XPUTER, etc. Reference is also made in particular in this context to the following patents and patent applications of the same applicant:

P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, PCT/DE 97/02949 (PACT02/PCT), PCT/DE 97/02998 (PACT04/PCT), PCT/DE 97/02999 (PACT05/PCT), PCT/DE 98/00334 (PACT08/PCT), PCT/DE 99/00504 (PACT10b/PCT), PCT/DE 99/00505 (PACT10c/PCT), DE 101 39 170.6 (PACT11), DE 101 42 903.7 (PACT11a), DE 101 44 732.9 (PACT11b), DE 101 45 792.8, (PACT11c), DE 101 54 260.7 (PACT11d), DE 102 07 225.6 (PACT11e), PCT/DE 00/01869 (PACT13/PCT), DE 101 42 904.5 (PACT21), DE 101 44 733.7 (PACT21a), DE 101 54 259.3 (PACT21b), DE 102 07 226.4 (PACT21c), PCT/DE 00/01869 (PACT13/PCT), DE 101 10 530.4 (PACT18), DE 101 11 014.6 (PACT18a), DE 101 46 132.1 (PACT18II), DE 102 02 044.2 (PACT19), DE 102 02 175.9 (PACT19a), DE 101 35 210.7 (PACT25), DE 101 35 211.5 (PACT25a), DE 101 42 231.8 (PACT25aII), (PACT25b). The entire contents of these documents are hereby included for the purpose of disclosure.

The above-mentioned architecture is used as an example to illustrate the present invention and is referred to hereinafter as VPU. The architecture includes an arbitrary number of arithmetic, logic (including memory) and/or memory cells and/or networking cells and/or communication/peripheral (IO) cells (PAEs—Processing Array Elements) which may be positioned to form a unidimensional or, multidimensional matrix (PA); the matrix may have different cells of any desired configuration. Bus systems are also understood here as cells. A configuration unit (CT) which affects the interconnection and function of the PA through configuration is assigned to the entire matrix or parts thereof. The configuration of a VPU is determined by writing configuration words into configuration registers. Each configuration word determines a subfunction. PAEs may require a plurality of configuration words for their configuration, e.g., one/or more words for the interconnection of the PAE, one/or more words for the clock determination and one/or more words for the selection of an ALU function, etc.

Generally, a processor which is operated at a higher clock frequency requires more power. Thus, the cooling requirements in modern processors increase substantially as the clock frequency increases. Moreover, additional power must be supplied which is critical in mobile applications in particular.

To determine the clock frequency for a microprocessor based on the state is known. Such technologies are known from the area of mobile computers. However, problems arise in the overall speed with which certain applications are carried out.

SUMMARY

An object of the present invention is to provide a novel method for commercial application.

In an example embodiment of the present invention, the power consumption may be reduced and/or optimized in VPU technology. As far as different methods are addressed in the following, it should be pointed out that they provide advantages, either individually or in combination.

In a data processing unit (VPU) according to a first aspect of the present invention, by using a field of clocked logic cells (PAEs). which is operable in different configuration states and a clock preselecting means for preselecting logic cell clocking, the clock preselecting means is designed in such a way that, depending on the state, a first clock is preselected at least at a first cell (PAE) and an additional clock is preselected at least at an additional cell (PAE).

It is therefore suggested to operate different cells using different clocking. As a rule, the additional clock corresponds to the first clock, the former is thus situated in a defined phase angle to the latter. In order to achieve optimum data processing results, in particular with regard to the required data processing time, as well as the power consumption of the entire data processing unit, it is suggested that clocking takes place depending on the state, which means that no clock is preselected jointly for all cells based on a certain state, but rather an appropriate clock is assigned to each cell based on the state.

Furthermore, it is suggested that the clocking be designed to be totally configurable, so that one calibration (configuration) mutually influences the clocking of the total number of cells.

It is possible and desired that the clock preselecting means is designed in such a way that it receives the setpoint clock for at least one first cell from a unit which preselects configuration states. This makes it possible to select the clocking of the cell based on its configuration as soon as this configuration is determined. This has the advantage that configuration may take place free of problems.

The unit preselecting configuration states may be a compiling unit, which means that required or desired clocking of the cell is already determined during the compiling of the program. If the compiling unit preselects the configuration states, then the cell configuration preselecting unit may convey clocking for cell configuration to a cell to be configured. This is advantageous since it is possible to merely add clock-determining information to the configuration word or the configuration instruction with which the configuration of a cell is determined, without additional measures being required such as the implementation of clock-assigning buses which separately transmit the clock-determining signals, or the like; it should be noted that this is possible in principle.

It may also be provided that the clock preselecting means is designed in such a way that it receives the setpoint clock or a clock-influencing signal from one of the other logic cells, in particular a configurable logic cell. This is particularly advantageous if a first logic cell awaits an input signal from an external unit and not until arrival of such signals are the cells to be activated which process subsequently arriving signals. This makes it possible to implement a logic field sleeping mode in which only one or a plurality of cells are activated, if necessary, on a very low level, i.e., very Blow clocking, and the remaining field is clocked extremely slowly. The clock frequencies required in the remaining field are dependent on physically necessary clocking which is required for the preservation of memory contents or the like.

It is also advantageous to receive a clock-influencing signal from another logic cell if, using one logic cell, one or a series of a plurality of different arithmetic and/or logical operations may be executed which, at least in part, require a different number of clock cycles, but this may not be determined in advance by the compiling unit. Also in such a case, the subsequent cells do not need to be operated at a high clock frequency if they are appropriately clocked down by corresponding signals which indicate the state of the cell participating in a processing sequence.

In a preferred variant, the clock preselecting means includes a central clock preselecting unit, e.g., a central clock generator, whose clock is transmitted to the individual cells via a clock line, as well as a local clock-generating unit for generating a local clock from and/or in response to the central clock transmitted via the clock line. In a possible embodiment, clocking of the central clock preselecting unit may be set or influenced by a configuration. The local clock-generating unit is preferably implemented by using a frequency divider and/or a frequency multiplier, and the frequency divider ratio is preferably determined by the preselections of the clock preselecting means according to the clock determination based on the state.

In a preferred variant, the logic cells or at least some of the logic cells include at least one ALU and/or are formed by such. It is possible and preferred if some of the logic cells contain at least one memory unit and/or register unit which may be assigned to the remaining logic cells. In particular, this unit may be provided for data to be processed and/or for configurations of the cell.

It is possible that a plurality of logic cells are identical and are operated using different clocking corresponding to their particular configuration. It is possible in particular that all logic cells are identical.

A method is also provided for operating a field of clocked logic cells which may be set into different configuration states, a first state being determined, at least temporarily, for at least one first cell, a clock which is to be assigned to the first cell being determined dependent on the first state and the cell being operated using this clock; a second state is determined for at least one additional cell, a second clock which is to be assigned to the second cell being determined dependent on the second state and the second cell being operated using the second clock which differs from the first clock.

As mentioned above, clocking may be preselected together with the configuration. The state is then the configuration state and/or is at least determined by it.

In known and configurable logic cells, cells are typically combined in groups for executing complex operations. If individual cells execute suboperations which run in fewer clock cycles as is the case with those cells which are [engaged] in particularly drawn-out suboperations of the complex total operations executed by the group, it is preferred if these cells are operated at different clock rates, namely in such a way that the cells for less complex operations, thus operations which run in fewer clock cycles, are clocked slower than the other cells; it is preferred in particular if the cells of one group are clocked collectively in such a way that the number of blank cycles within the group is minimized. An alternative and/or an addition to this lies in the fact of temporarily changing the use of cells burdened with less complex tasks for a certain number of clock cycles, thus changing the use during a fixed number of clock cycles.

In particular, the case may occur that the maximum clock cycle rate of PAEs and/or PAE groups is limited by their function and in particular by their interconnection. The propagation time of signals via bus systems plays an increasingly frequency-limiting role, in particular in advancing semiconductor technology. Henceforth, the method allows slower clocking of such PAEs and/or PAE groups, while other PAEs and/or PAE groups operate at a different and, if needed, higher frequency. It is suggested in a simplified embodiment to make the clock rate of the entire reconfigurable module (VPU) dependent on the maximum clock rate of the slowest PAE and/or PAE group. In other words, the central clock preselecting unit may be configured in such a way that the highest mutual operating clock of all PAEs and/or PAE groups (in other words the smallest common denominator of all maximum clock rates) is globally generated for all PAEs.

The above-described method is particularly advantageous if the cells of the group process data sequentially, i.e., the result determined by one cell is passed on to one or multiple cells which are subsequently processing data.

It should be noted that in addition to prioritizing tasks within the cell field for clock preselection, the condition of a power source may also be included in cell clocking determination. Clocking may be reduced overall in the case of a drop in supply voltage, in particular in mobile applications. Clocking-down for preventing an overtemperature by responding to a temperature sensor signal or the like is equally possible. It is also possible for the user to preset the clock preselection. Different parameters may jointly establish the clock-determining state.

It was mentioned above that it is possible to perform time division multiplexing for carrying out multiple configurations on the same PAE. A preferred and enhanced design makes particularly resource-saving time division multiplexing for carrying out multiple configurations on the same PAE possible; the design may have advantages independently from the different clocking of individual cells, e.g., when latencies have to be taken into account which occur in the signal transmission of digital data via a bus, such as configuration data, data to be processed, or the like. These problems are particularly serious when reconfigurable modules, having reconfigurable units which are located in part comparatively far apart from one another, are to be operated at high clock frequencies. The problem arises here that due to the special configuration of VPUs, a plurality of arbitrary PAEs is connected via buses and considerable data transmission traffic exists via the buses. The switching frequency of transistors is expected to further increase in modern and above all in future silicon technologies, while the signal transmission via buses is to increasingly become a performance-limiting factor. It is therefore suggested to decouple the data rate or frequency on the buses vis-a-vis the operating frequency of the data-processing PAEs.

A particularly simple embodiment, preferred for simple implementations, operates in such a way that the clock rate of a VPU is only globally settable. In other words, a settable clock may be preselected for all PAEs or it may be configured by a higher-level configuration unit (CT). All Parameters which have an effect on clocking determine this one global clock. Such parameters may be, for example, a temperature determination, a power reserve measurement of batteries, etc.

A determining parameter may be in particular the maximum operating frequency of the slowest configuration which results as a function of a PAE configuration or a configuration of a group of PAEs. Since different configurations may include different numbers of PAEs over stretches of bus connections of different lengths, it was realized, in particular in bus signal transmission-limiting applications, that configurations may have different maximum frequencies. Configurations may have different maximum frequencies, as is known from FPGAs, for example, which depend on the particular function of the PAEs and in particular on the lengths of bus connections. The slowest configuration then ensures that the proper operation of this configuration is also ensured, and simultaneously reduces the power demand of all other configurations which is advantageous in particular when different portions of the data processing such as through the other configurations, which would possibly run at higher clock frequencies, are not needed prior to the slowest configuration. Also in cases where it must be absolutely ensured that proper operation takes place, the possibly only negligible performance loss occurring by clocking-down other configurations, which could run faster per se, is often acceptable.

In an optimized embodiment, the frequency is adapted only to the configurations which are currently carried out on a VPU, in other words, the global frequency may be reset/reconfigured with each configuration.

In an enhanced embodiment, the clock may then be configured globally, as well as, as described above, individually for each configurable element.

It should be noted that different variants are possible, individually or in combination. In order to show a detailed example, it is assumed in the following, without this necessarily being the case, that the clock may be controlled individually in each PAE. This offers the following possibilities, for example:

a) Controlled Enabling and Disabling of the Clock

It is preferred that the processing clock of PAEs is disabled, i.e., the PAEs operate only in case of need; clock enabling, i.e., activating the PAE, may take place, for example, under at least one of the following conditions, namely when valid data is present; when the result of the previous computation is approved; due to one or more trigger signals; due to an expected or valid timing mark, compare DE 101 10 530.4 (PACT18).

In order to cause clock enabling, each individual condition may be used either individually or in combination with other conditions, clock enabling being computed based on the logical combination of conditions. It should be noted that it is possible to put the PAEs into a power-saving operating mode while a clock is disabled, for example, through additionally partly switched-off or reduced power supply, or, should it be necessary because of other reasons, through extremely reduced sleeping clocks.

b) Different Frequencies per PAE

Technologies for controlling sequences in VPUs are known from PCT/DE 97/02949 (PACT02/PCT), PCT/DE 97/02998 (PACT04/PCT), and PCT/DE 00/01869 (PACT13/PCT). Special sequencers (SWTs) which control a large number of PAEs and which are responsible for their (re)configuration are configured in PCT/DE 97/02998 (PACT04/PCT). The (re)configuration is controlled by using status signals which are generated by the PAEs (triggers) and passed on to the SWTs, namely in that the SWT responds to the triggers, making the particular continuation of a sequence dependent on the triggers.

A small memory for their configuration is assigned to each individual PAE in PCT/DE 97/02949 (PACT02/PCT). A sequencer passes through the memory and addresses the individual configurations. The sequencer is controlled by triggers and/or by the status of its PAE (into which it may be integrated, for example).

During data processing, it is now possible that different sequencers in different PAEs have to carry out a different number of operations per transmitted data packet (compare DE 101 39 170.6 (PACT11), DE 101 42 903.7 (PACT11a), DE 101 44 732.9 (PACT11b), DE 101 45 792.8 (PACT11c), DE 101 54 260.7 (PACT11d), DE 102 07 225.6 (PACT11e), PCT/DE 00/01869 (PACT13/PCT)). This is described using a configuration as an example in which 3 sequencers are involved in processing a data packet, requiring a different number of operations for data packet processing. Example:

Sequencer 1 (Seq1) requires 10 operations for processing a data packet,

Sequencer 2 (Seq2) requires 5 operations for processing a data packet,

Sequencer 3 (Seq3) requires 20 operations for processing a data packet.

In order to obtain an optimum operation/power consumption ratio, the individual sequencers would have to be clocked as follows:

Fmax=$F_{seq2}/4=F_{seq1}/2=F_{seq3}$ or at a maximum operating frequency of, for example, 100 MHz: $F_{seq1}$=50 MHz $F_{seq2}$=25 MHz, $F_{seq3}$=100 MHz.

It is suggested in particular to use different clock sources for each PAE and/or group of PAEs. For example, different techniques may be used for this purpose, either individually or jointly:

1) Clock dividers, individually programmable per PAE, which enable an individually configurable divider ratio based on one or more mutual base clocks.
2) Clock multipliers. (PLLs), individually programmable per PAE, which enable an individually configurable divider ratio based on one or more mutual base clocks.
3) Deriving the particular PAE clock from the data stream of the particular data to be processed, e.g., by oversampling.

Figure 1:
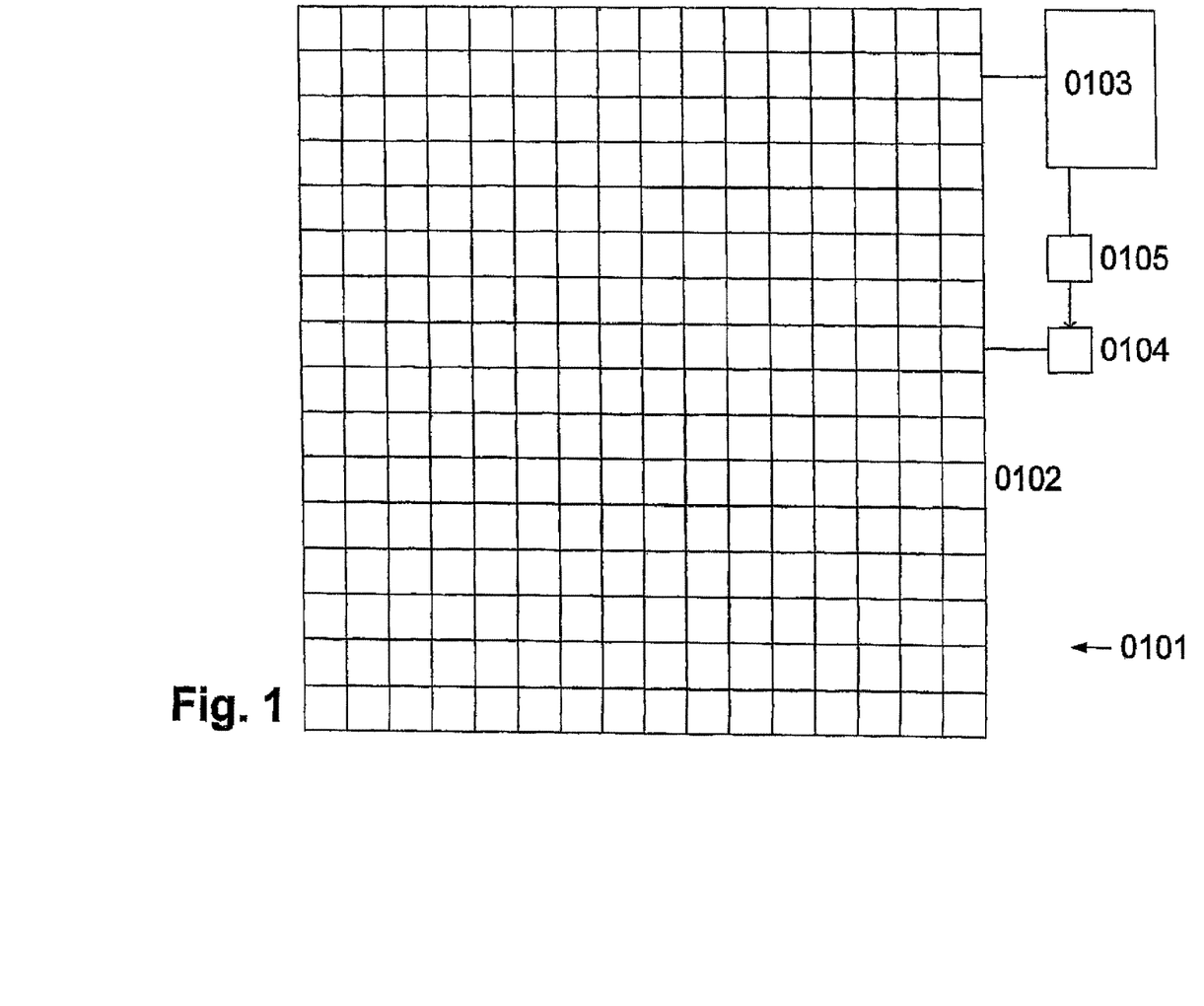
FIG. 1 shows a reconfigurable data processing unit.

An exemplary embodiment having different algorithms is illustrated in FIG. 1.

c) Configuration Clock

Optimization of the power consumption is also favored in that the circuit components, necessary for executing a configuration, are clocked selectively, i.e., it is suggested to clock each PAE addressed and/or to completely disable the clock of those circuit components necessary for executing a configuration or a reconfiguration when no configuration or reconfiguration is being executed and/or to use static registers.

In particular example embodiments, the operating frequency of the PAEs or groups of PAEs may be Made dependent on different and/or additional factors. The following is listed below as an example:

1. Temperature Measurement

If the operating temperature reaches certain threshold values, the operating clock is reduced correspondingly. The reduction may take place selectively by initially operating those PAEs on a lower clock which represent the most irrelevant performance loss.

In a particularly preferred embodiment, multiple temperature measurements may be performed in different regions and clocking may be adapted locally.

2. Buffer Filling Levels

IO-FIFOs (input-output-first-in-first-out-circuits) which decouple peripheral data transmissions from data processing within a VPU are described in DE 102 06 653.1 (PACT15), DE 102 07 224.8 (PACT15a), (PACT15b). One buffer for input data (input buffer) and/or one buffer for output data (output buffer) may be implemented, for example. A particularly efficient variable for determining the clock frequency may, for example, be determined from the filling level of the particular data buffers. The following effects and measures may occur, for example:

a) An input buffer is largely full and/or the filling level rises abruptly: Clocking increase to accelerate processing.
b) An input buffer is largely empty and/or the filling level drops abruptly: Clocking decrease to decelerate processing.
c) An output buffer is largely full and/or the filling level rises abruptly: Clocking decrease to decelerate processing.
d) An output buffer is largely empty and/or the filling level drops abruptly: Clocking increase to accelerate processing.

Depending on the application and the system, suitable combinations may be implemented accordingly.

It should be pointed out that such a clock frequency determination is implementable if a filling level determination means for a buffer, in particular an input and/or output buffer, alternatively also an intermediate buffer within a VPU array, is provided and if this filling level determination means is connected to a clock preselecting means for preselecting logic cell clocking so that this clock preselecting means is able to change the logic cell clocking in response to the buffer filling level.

3. Battery Charge State

It is imperative to be careful with the power supply, e.g., a battery, for mobile units. Depending on the power reserve, which may be determined based on the existing methods according to the related art, the frequency of PAEs and/or groups of PAEs is determined and is reduced in particular when the power reserve is low.

Besides or in addition to optimizing data processing clocking it is also possible to accomplish an optimization of the data transmission with respect to the relationship between data transmission and data processing.

In a particular embodiment, the clock controls of PAEs described may be enhanced in such a way that, by using a sequencer-like activation and a suitable register set, for example, multiple, preferably different, configuration words may be executed successively in multiple clocks. A sequencer, sequentially processing a number of configuration inputs, may be additionally assigned to the configuration registers and/or to a configuration memory Which is possibly also decoupled and implemented separately (compare DE 102 06 653.1 (PACT15), DE 102 07 224.8 (PACT15a, PACT15b). The sequencer may be designed as a microcontroller. In particular, the sequencer may be programmable/configurable in its function such as Altera's module EPS448(ALTERA Data Book 1993). Possible embodiments of such PAEs are described, for example, in the following patent applications which are included in their entirety for the purpose of disclosure: PCT/DE 97/02949 (PACT02/PCT), PCT/DE 97/02998 (PACT04/PCT), PCT/DE 00/01869 (PACT13/PCT), DE 101 10 530.4 (PACT18), DE 102 06 653.1 (PACT15), DE 102 07 224.8 (PACT15a, PACT 15b).

For the following, it is initially assumed that multiple configuration words are combined into one configuration (PACKEDCONF) and are configured on a PAE. The PACKEDCONF is processed in such a way that the individual configuration words are executed in chronological succession. The data exchange and/or status exchange between the individual timed configurations takes place via a suitable data feedback in the PAEs; for example by using a suitable register set and/or another data exchange and/or status/exchange means such as suitable memories and the like.

This method allows a different-timing for PAEs and bus systems. While PAEs process data at very high clock rates, for example, operands and/or results are transmitted via a bus at only a fraction of the clock rate of the PAEs. The transmission time via a bus may be correspondingly longer.

It is preferred if not only the PAEs or other logic units in a configurable and/or reconfigurable module are clockable at a different rate, but also if different clocking is provided for parts of a bus system. It is possible here to provide multiple buses in parallel whose speed is clocked differently, i.e., a bus which is clocked particularly high for providing a high-performance connection, parallel to a bus which is clocked lower for providing a power-saving connection. The connection clocked high may be used when longer signal paths have to be compensated, or when PAEs, positioned close together, operate at a high frequency and therefore also have to exchange data at a high frequency in order to provide a good transmission here over short distances in which the latency plays a minor role at best. Therefore, it is suggested in a possible embodiment that a number of PAEs, positioned together locally and combined in a group, operate at a high frequency and possibly also sequentially and that local and correspondingly short bus systems are clocked high correspondingly to the data processing rate of the group, while the bus systems, inputting the operands and outputting the results, have slower clock and data transmission rates. For the purpose of optimizing the power consumption, it would be alternatively possible to implement slow clocking and to supply data at a high speed, e.g., when a large quantity of inflowing data may be processed with only a minor operational effort, thus at low clock rates.

In addition to the possibility of-providing bus systems which are clocked using different frequencies it is also possible to provide multiple bus systems which are operable independently from one another and to then apply the PAEs in a multiplex-like manner as required. This alone makes it possible to operate reconfigurable modules particularly efficiently in resource multiplexing, independently from the still existing possibility of differently clocking different bus systems or different bus system parts. It is possible here to assign different configurations to different resources according to different multiplexing methods.

According to PCT/DE 00/01869 (PACT13/PCT), a group of PAEs may be designed as a processor in particular.

In the following embodiments, for example, different configurations are assigned to data-processing PAEs using time-division multiplexing, while bus systems are assigned to the different configurations using space-division multiplexing.

In the assignment of resources, i.e., the assignment of tasks to PAEs or a group of PAEs to be carried out by the compiler or a similar unit, the given field may then be considered as a field of the n-fold variable and code sections may be transferred to this field of resources, which is virtually scaled up by the factor n, without the occurrence of problems, particularly when code sections are transferred in such a way that no interdependent code sections have to be configured into a PAE which is used in a multiplex-like manner.

In the previous approach, a PACKEDCONF was composed of at least one configuration word or a bundle of configuration words for PAEs which belong to one single application. In other words, only configuration words which belong together were combined in the PACKEDCONF.

In an enhanced embodiment, at least one or more configuration words per each different configuration are entered into a PACKEDCONF in such a way that the configuration word or words which belong together in a configuration are combined in a configuration group and the configuration groups thus created are combined in the PACKEDCONF.

The individual configuration groups may be executed in chronological succession, thus in time-division multiplexing by a timeslice-like assignment. This results in time division multiplexing of different configuration groups on one PAE. As described above, the configuration word or the configuration words within a configuration group may also be executed in chronological succession.

Multiplexers which select one of the configuration groups are assigned to the configuration registers and/or to a configuration memory, which is possibly also decoupled and implemented separately (compare DE 102 06 653.1 (PACT15), DE 102 07 224.8 (PACT15a, PACT 15b)). In an enhanced embodiment, a sequencer (as described above) may be additionally assigned which makes the sequential processing of configuration words within configuration groups possible.

Using the multiplexers and the optional sequencer, a resource (PAE) may be assigned to multiple different configurations in a time-division multiplex method.

Among one another, different resources may synchronize the particular configuration group to be applied, for example by transmitting a configuration group number or a pointer.

The execution of the configuration groups may take place linearly in succession and/or cyclically, with a priority being observed. It should be noted here in particular that different sequences may be processed in a single processor element and that different bus systems may be provided at the same time so that no time is wasted in establishing a bus connection which may take some time due to the long transmission paths. If a PAR assigns its first configuration to a first bus system and, on execution of the first configuration, couples the same to the bus system, then it may, in a second configuration, couple a different or partially different bus system to the former if spacial multiplexing for the bus system is possible.

The execution of a configuration group, each configuration group'being composed of one or more configuration words, may be made dependent on the reception of an execution release via data and/or triggers and/or an execution release condition.

If the execute release (condition) for a configuration group is not given, the execute release (condition) may either be awaited, or the execution of a subsequent configuration group may be continued. The PAEs preferably go into a power-saving operating mode during the wait for an execute release (condition), for example with a disabled clock (gated clock) and/or partially disabled or reduced power supply. If a configuration group cannot be activated, then, as mentioned above, the PAEs preferably also go into a power-saving mode.

The storage of the PACKEDCONF may take place by using a ring-type memory or other memory or register means, the use of a ring-type memory resulting in the fact that after the execution of the last input, the execution of the first input may be started again (compare PCT/DE 97/02998 (PACT04/PCT)). It should be noted that it is also possible to skip to a particular execution directly and/or indirectly and/or conditionally within the PACKEDCONF and/or a configuration group.

In a preferred method, PAEs may be designed for processing of configurations in a corresponding time-division multiplexing method. The number of bus systems between the PAEs is increased such that sufficient resources are available for a sufficient number of configuration groups. In other words, the data-processing PAEs operate in a time-division multiplex method, while the data-transmitting and/or data-storing resources are adequately available.

This represents a type of space division multiplexing, a first bus system being assigned to a first temporarily processed configuration, and a second bus system being assigned to an additional configuration; the second bus system runs or is routed spacially separated from the first bus system.

It is possible at the same time and/or alternatively that the bus systems are also entirely or partially operated in time-division multiplexing and that multiple configuration groups share one bus system. It may be provided here that each configuration group transmits its data as a data packet, for example, a configuration group ID being assigned to the data packet (compare APID in DE 102 06 653.1 (PACT15)/DE 102 07 224.8 (PACT 15a, PACT 15b)). Subsequently it may be provided to store and sort the particular data packets transmitted based on their assigned identification data, namely between different buses if required and for coordinating the IDs.

In an enhanced method, memory sources may also be run in a time-division multiplex, e.g., by implementing multiple segments and/or, at a change of the configuration group, by writing the particular memory/memories as described in PCT/DE 97/02998 (PACT04/PCT) and/or PCT/DE 00/01869 (PACT13/PCT) into a different or even external memory or by loading from the same. In particular the methods as described in DE 102 06 653.1 (PACT15), DE 102 07 224.8 (PACT15a, PACT 15b) may be used (e.g., MMU paging and/or APID).

The adaptation of the operating voltage to the clock should be noted as a further possibility for conserving resources.

Semiconductor processes typically allow higher clock frequencies when they are operated at higher operating voltages. However, this causes substantially higher power consumption and may also reduce the service life of a semiconductor.

An optimum compromise may be achieved in that the voltage supply is made dependent on the clock frequency. Low clock frequencies may be operated at a low supply voltage, for example. With increasing clock frequencies, the supply voltage is also increased (preferably up to a defined maximum).

BRIEF DESCRIPTION OF THE DRAWINGS

FIG. 3b shows a table indicating numbers of clock cycles and clock rates for the cells of FIG. 3a.

DETAILED DESCRIPTION OF EXAMPLE EMBODIMENTS

The present invention, as an example, is explained in greater detail below with reference to the Figures. It should be noted that this exemplary description is not limiting and that in isolated cases and in different figures identical or similar units may be denoted using different reference numbers.

As an example, FIG. 1 shows a reconfigurable data processing unit (VPU (0101). A configuration unit (CT, 0103) for the control and execution of the configuration and reconfiguration is superordinated to an array of PAEs (0102) which are configurable and reconfigurable independently from one another. In this connection, particular reference is made to the various applications of the applicant and the disclosure content of the patents and technologies described above. In addition, a central clock generator (0104) is assigned to the data processing unit. In a possible. embodiment, the clock rate of the central clock generator may be preselected by configuration unit 0103. In a possible embodiment, the clock rate of each PAE and/or groups of PAEs and their bus connections may also be preselected by configuration unit 0103.

Figure 2:
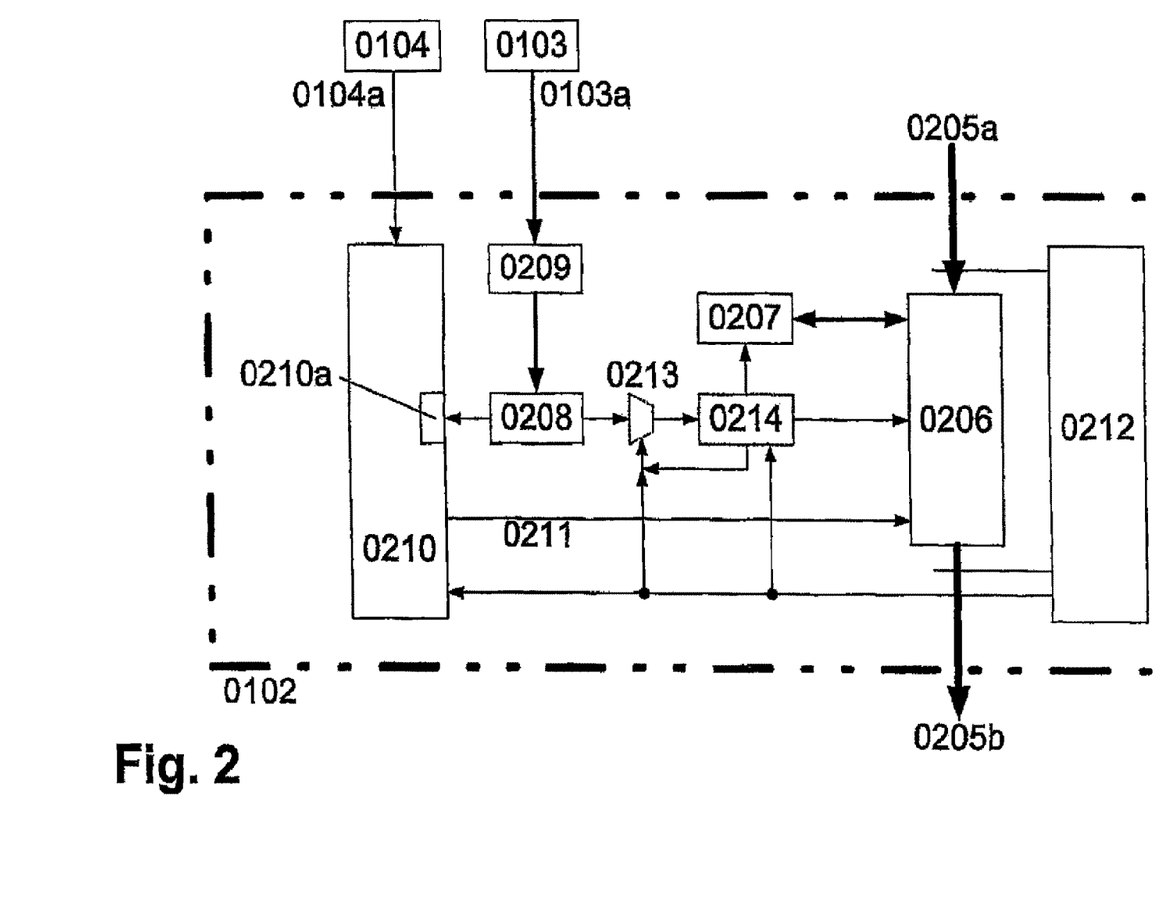
FIG. 2 shows a configuration unit feeding configuring data via a configuration line into a respective cell.

According to FIG. 2, configuration unit 0103 feeds configuring data via a configuration line 0103a into respective cells 0102 of which only one is illustrated as an example. Furthermore, the clock signal of central clock generator 0104 is fed to cell 0102 via a clock line 0104a. Via a data bus input 0205a and a data bus output 0205b, reconfigurable cell 0102 communicates with other cells and additionally has a data processing unit, e.g., an arithmetic logic unit ALU 0206, and preferably an internal data memory 0207 and a configuration memory 0208 into which configuring instructions from configuration unit 0103 are fed via a configuration instruction extractor 0209 in order to configure the data processing unit, e.g., ALU 0206, as a response. In addition, configuration (instruction) extractor 0209 is connected to a frequency divider/ multiplier factor preselecting input 0210a of a frequency divider/frequency multiplier 0210 which is designed to divide or multiply the clock signal of central clock generator 0104 on clock line 0104a according to a clock ratio preselected via input 0210a and to feed the clock signal to the data processing unit, e.g., arithmetic logic unit ALU 0206, and possibly other units of reconfigurable cell 0102 via a line 0211. Using an optional data bus monitoring circuit 0212, 0210 may be activated in such a way that the frequency is controlled depending on the data reception or the data transmission.

Furthermore, a multiplexer 0213 for selecting different configurations and/or configuration groups may optionally be integrated dependent on 0212. Furthermore, the multiplexer may optionally be activated by a sequencer 0214 in order to make sequential data processing possible. In particular, intermediate results may be managed in data memory 0207.

While the general configuration of the cell was described in part in the applicant's applications described above, the presently described clock dividing system, the associated circuit, and the optimization of its operation are at least novel and it should be pointed out that these facts may and shall be associated with the required hardware changes.

The entire system and in particular configuration unit 0103 is designed in such a way that, together with a configuring signal with which a configuration word is fed via configuration line 0103a via configuration word extractor 0209 to data processing unit 0206 or upstream and/or downstream and/or associated memory 0208, a clock dividing/multiplying signal may also be transmitted which is extracted by configuration word. extractor 0209 and transmitted to frequency divider/multiplier 0210, so that, as a response, 0210 may clock data processing unit 0206 and possibly also other units. It should be pointed out that, as a response to an input signal to the cell, there are also other possibilities instead of unit 0209 to vary clocking of an individual data processing unit 0206 with reference to a central clock unit 0104, via data bus monitoring circuit 0212, for example.

Figure 3A:
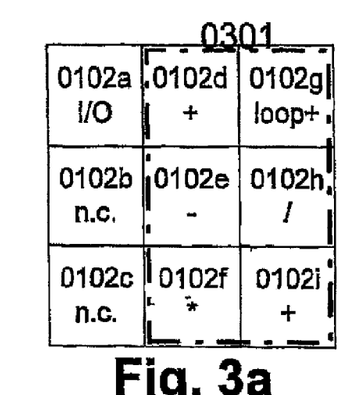
FIG. 3a shows a 3×3 field of configurable cells.
Figure 3B:
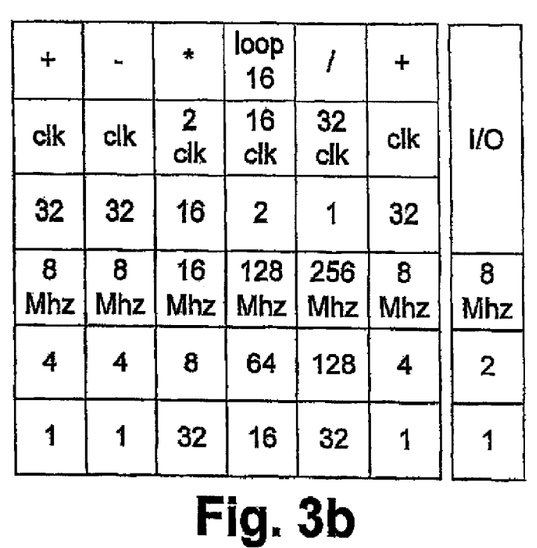
Figure 4:
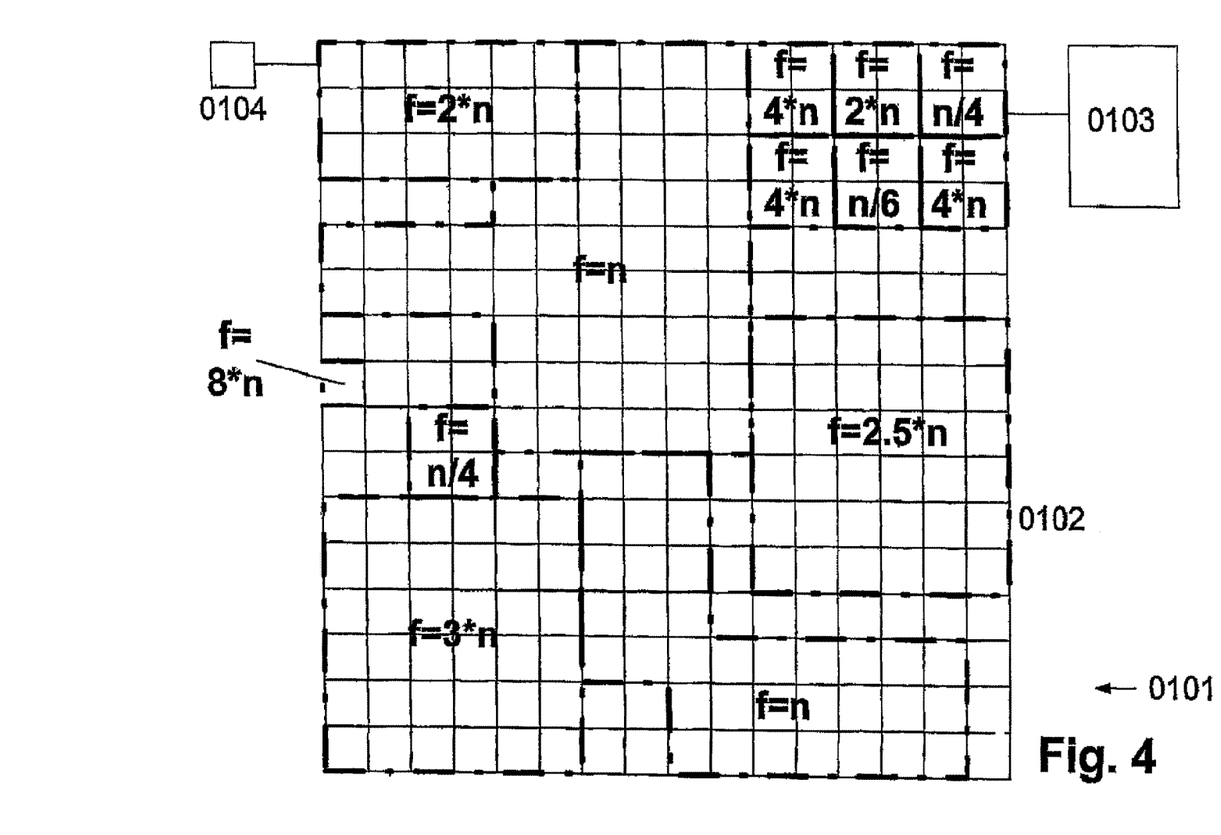
FIG. 4 shows the data processing unit (VPU) according to FIG. 1.

Described only as an example with reference to FIGS. 3 and 4, an entire field of all reconfigurable logic units 0102 may be operated using the above-described embodiment, but possibly also by implementing the units in a different way.

For example, a 3×3 field of reconfigurable cells is configured In such a way, according to FIG. 3a, that a first cell 0102a is used for analyzing an input/output signal. Cells 0102b, 0102c are presently not needed and are therefore denoted as not configured (n. c.). Cells 0102d through 0102i together form a group which executes a complex arithmetic operation; an addition takes place in cell 0102d, a subtraction takes place in cell 0102e, a multiplication takes place in cell 0102f, a loop is run in cell 0102g, a multiple addition being executed within the loop, a division takes place in cell 0102h, and an addition in turn takes place in cell 0102i. Cells 0102d through 0102i are connected to one another in group 0301, indicated by dot and dash lines, in such a way that data is sequentially and pipeline-like processed by the cells. As is indicated in the second row of the table in FIG. 3b, the operations within cells 0102d and 0102e are executed in a different number of clock cycles. The number of clock cycles is denoted there and it is clear that an addition or a subtraction may be executed in one clock cycle; the division, however, requires 32 clock cycles. The third line of the table in FIG. 3b denotes which value is assigned to the frequency divider of each cell in order to achieve optimum power usage at a constant data throughput through the cell. Only the cell in which the division takes place is operated at the highest clock; the clock ratio here is 1. This cell requires the longest time for the operation assigned to it. Since a new result has to be delivered only every 32 clock pulses to cell 0102h executing the division, cells 0102d and 0102e are clocked slower by the appropriate factor of 32; the frequency divider ratio for these cells is therefore 32, as can be seen in FIG. 3b. The multiplication running in two clock cycles has a frequency divider ratio of 16, and the more complex loop of cell 0102g running in 16 clock cycles is assigned a frequency divider ratio of only 2. These clock ratios are initially known at the configuration, in which the individual cells are compiled in groups and are assigned to each cell within the group since they were determined by the compiler at program compilation and may therefore be input into the cell at its configuration. It is denoted in the fourth row from the top which clock rate results from a central clock of 256 MHz.

If the processor unit having the separately clockable reconfigurable logic cells is operated in an application where the voltage may drop, e.g., due to exhausting voltage supply capacities, it may be provided that, at a drop in the supply voltage, the entire frequency is reduced to a critical value U1; all cells are subsequently clocked slower by one half so that division cell 0102h too runs only at 128 MHz, while cell 0102d is clocked at 4 MHz. Cell 0102a, executing a query of the mouse pointer having a lower priority, is no longer clocked at 8 MHz as previously but rather at 2 MHz, i.e., depending on the prioritization, different slowdowns according to the importance of the task are assigned to the respective groups at a voltage drop or under other circumstances.

If, for other reasons, the temperature still rises, the heat generation in the logic cell field may be further reduced by an additional clock rate reduction for the logic cells, as is indicated in the last row of FIG. 3b. It is understood that, for example, a particular individual sensor for determining the condition such as the supply voltage and/or the temperature may be provided whose sensor signal is fed to the cells in a conditioned manner; a corresponding sensor system may be assigned to each cell and/or the central clock is possibly modifiable.

This makes it possible to optimally operate a processor field energy efficiently; the cooling capacity required is reduced and it is clear that, since as a rule not all cells may and/or must be permanently operated at the highest clock frequency, heat sinks and the like may be dimensioned appropriately smaller which in turn offers additional cost advantages.

It should be noted that in addition to the query regarding a supply voltage, a temperature, the prioritization of computations, arid the like, other conditions may determine the clock. For example, a hardware switch or a software switch may be provided with which the user indicates that only low clocking or higher clocking is desired. This makes an even more economical and targeted handling of the available power possible. It may be provided in particular that, at the user's request or at an external request, the central clock rate in total may be reduced; the clock divider ratios within the cell array, however, are not changed in order to avoid the requirement of reconfiguring all cells, e.g., at an extreme temperature rise. Moreover, it should be pointed out that a hysteresis characteristic may be provided in determining the clock rates, when a temperature-sensitive change of the clock frequencies is to be performed, for example.

FIG. 4 shows the data processing unit (VPU) according to FIG. 1. Different groups within the VPU are operated using different frequencies f which are derived from a frequency normal n generated by 0104. It should be expressly noted that multiple frequency normals ($n_1 \ldots n_n$) may be generated by multiple 0104 and may be used within one VPU.

Figures 5, 6A:
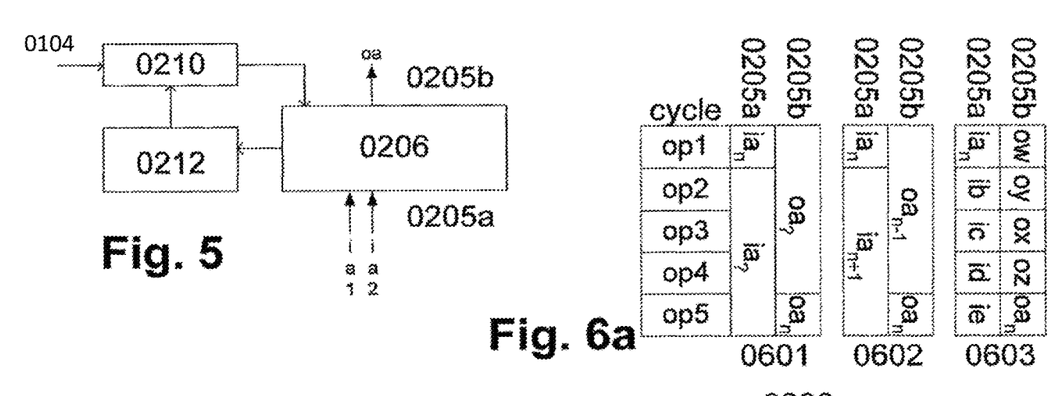
FIG. 5 shows an example embodiment of the operation of a PAE according to FIG. 2.
FIG. 6a shows an example of the transmission of data on a data bus.

FIG. 5 shows a simple exemplary embodiment for the operation of a PAE according to FIG. 2. A-data bus (0205a) delivers operands ia1 and ia2 to an ALU (0206) which in turn delivers the result of the computation oa to 0205b. The PAE is only activated, i.e., clocked and/or supplied with current, when data bus monitoring circuit 0212 recognizes the acceptance of the previous result oa by the receiver and the arrival of operands ia1 and ia2 necessary for the operation. In other words, the PAE is only activated when all working conditions and requirements are met. The clock release is carried out by 0210, the clock source is 0104a.

Figure 6:
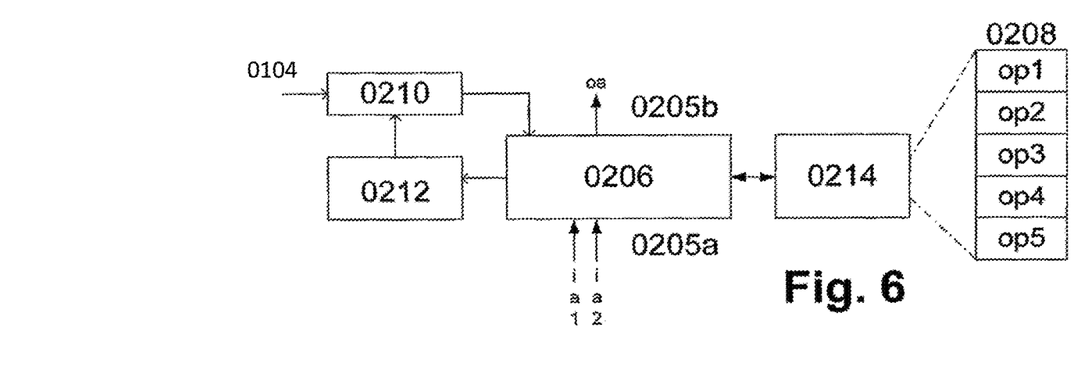
FIG. 6 shows an example embodiment of the operation of a PAE, including activation of a sequencer.

FIG. 6 corresponds to FIG. 5 with the exception that a sequencer (0214) is additionally activated which controls a multicyclical configuration (e.g., a complex computation such as a matrix multiplication or the like). The sequencer extracts the operations from the configuration memory or from a section of the configuration memory. In the example shown, operations op1, op2, op3, op4, op5 are carried out sequentially. Result oa is conveyed after completion and the PAE has to be activated again.

The data transmission occurring on data'bus 0205a/b is illustrated in FIG. 6a. It should be pointed out that the data routing via the bus may take place in a conventional manner, i.e., collision and deadlock situations may be prevented for one configuration at a time in a conventional manner.

In order to execute op1, operands is mist be available via 0205a (0601); the data transmissions for the remaining cycles may be undefined in principle.

Thereafter, 0205a may preferably transmit the subsequent operands (0602) for which the execution time of op2, op3, op4, op5 is available, thus creating a temporal decoupling, allowing the use of slower and/or; in particular, longer bus systems.

During the execution of op2, op3, op4, op5, data of other configurations may alternatively (0603) be transmitted via the same bus system 0205a using a time-division multiplex method.

Following op5, result oa is applied to bus 0205b (0601); the data transmissions for the remaining cycles may be undefined in principle.

The time prior to op5, i.e., during the, execution of op1, op2, op3, op4, may be used for transmitting the previous result (0602). This again creates a temporal decoupling, allowing the use of slower and/or, in particular, longer bus-systems.

During the execution of op1, op2, op3, op4, data of other configurations may alternatively (0603) be transmitted via the same bus system 0205b using a time-division multiplex method. For clock multiplication, 0210 may use a PLL. A PLL may be used in particular in such a way that the operating clock of the PAE for executing op1, op2, op3, op4, op5 is five times that of the bus clock. In this case, the PAE may act as a PAE without a sequencer having only one (unicyclical) configuration and the same clock as the bus clock.

Figure 7:
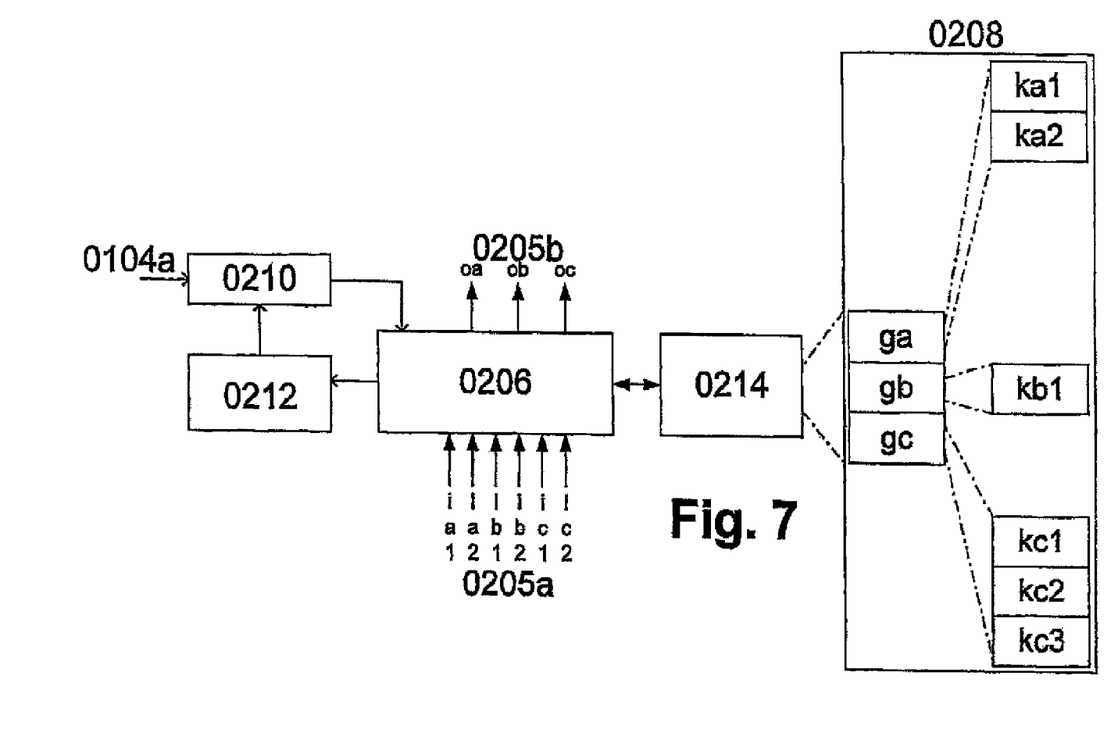
FIG. 7 shows an example embodiment of the operation of a PAE, in which multiple configuration groups share the PAE.

FIG. 7 corresponds to FIG. 6 plus the addition that multiple configuration groups (ga, gb, gc) share the PAE in a time-division multiplexed manner and each group has connections to a separate (space-division multiplexed) bus system (ia/oa, ib/ob, ic/oc). A multiplexer in 0214 cyclically selects the groups ga, gb, gc. Provided the data monitoring circuit 0212 generates a valid execution release (condition) for a configuration group, the particular configuration group is executed; otherwise the execution release (condition) may be awaited or, preferably, a different subsequent configuration group may be selected. The configuration groups may be run through cyclically.

One configuration group may contain multiple configuration words (ga={ka1, ka2}, gb={kb1}, gc={kc1, kc2, kc3}). The configuration words may be executed sequentially in 0214 using a sequencer.

Figure 7A:
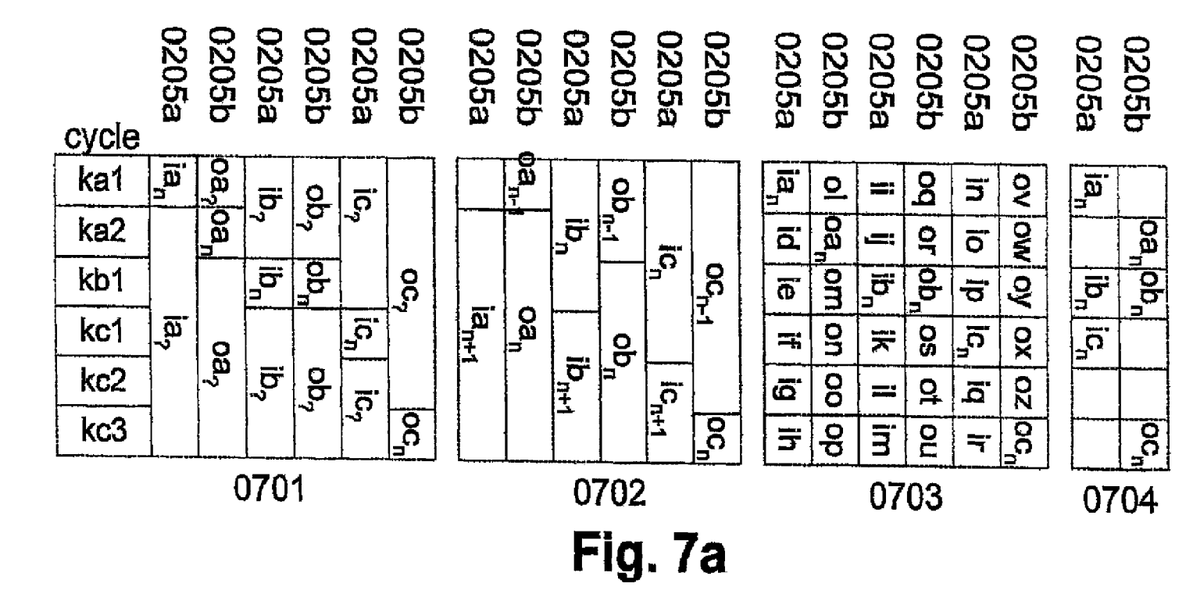
FIG. 7a shows example bus transmission in accordance with FIG. 7.

FIG. 7a shows the bus transmissions according to the example in FIG. 7. 0701 corresponds to 0601, 0702 corresponds to 0602, 0703 corresponds to 0603; a separate bus system is used thereby for each group ga, gb, gc.

In addition, a possible bus transmission using a time-division multiplex for the bus systems is illustrated in 0704. The input data of all groups is transmitted via an input bus system and the output data of all groups is transmitted via an output bus system. The undefined intermediate cycles are either unused or are free for other data transmissions.

The invention claimed is:

1. A method of processing data in a multicore processor, the multicore processor including a plurality of programmable data processing units that each (a) is adapted for clocked data processing and (b) includes at least one respective Arithmetic Logic Unit (ALU), the method comprising, at runtime:
determining that a first one of a plurality of implementable clock frequencies is to be implemented for data processing by a first one of the plurality of programmable data processing units, wherein the first clock frequency is slower than a maximum one of the plurality of implementable clock frequencies, wherein the multicore processor includes a plurality of clock multipliers via which a base clock frequency is convertible into respective different ones of the plurality of implementable clock frequencies that are different than the base clock frequency, which correspond to respective division ratios; and
based on the determination:
generating, by one of the clock multipliers and using the base clock frequency, a local clock whose first clock rate is at the determined first one of the plurality of implementable clock frequencies; and
under control of the local clock generated by the one of the clock multipliers, performing, by the first programmable data processing unit, the data processing at the first clock rate, while a second one of the plurality of programmable data processing units processes data under influence of a second one of the plurality of clock multipliers, at a second clock rate that is set by the second clock multiplier at a second one of the implementable clock frequencies that is higher than the first one of the plurality of implementable clock frequencies.

2. The method of claim 1, wherein data is processed sequentially via the data processing by the first data processing unit.

3. The method of claim 1, wherein the data processing by each of the first and second data processing units is a sequential data processing.

4. The method of claim 1, wherein the determination of the first clock frequency is made based on a task execution priority.

5. The method of claim 1, wherein the determination of the first clock frequency is made based on a drop in a supplied voltage.

6. The method of claim 1, wherein the determination of the first clock frequency is made based on a temperature.

7. The method of claim 1, wherein the determination of the first clock frequency is made based on a task execution priority and a drop in a supplied voltage.

8. The method of claim 1, wherein the determination of the first clock frequency is made based on a task execution priority and a temperature.

9. The method of claim 1, wherein the determination of the first clock frequency is made based on a drop in a supplied voltage and a temperature.

10. The method of claim 1, wherein the determination of the first clock frequency is made based on a task execution priority, a drop in a supplied voltage, and a temperature.

11. The method of claim 1, wherein the multicore processor includes for each of the plurality of programmable data processing units, a respective sensor for sensing a voltage that is supplied.

12. The method of claim 1, further comprising sensing by a sensor associated with the first programmable data processing unit a supplied voltage associated with the first programmable data processing unit, wherein the determination of the first clock frequency is made based on the sensed voltage.

13. The method of claim 1, further comprising sensing respective temperatures at each of a plurality of regions, wherein the determination of the first clock frequency is made based on one of the sensed temperatures which is of one of the plurality of regions in which the first programmable data processing unit is located.

14. The method of claim 1, wherein the first clock frequency is a reduced frequency to which a rate of operation of the first programmable data processing unit has been reduced, and the method further comprises, responsive to a subsequent sensing of a rise in temperature, further reducing the rate of operation of the first programmable data processing unit to an even lower frequency.

15. The method of claim 1, wherein:
the multicore processor is part of a mobile device having, as a voltage source, a battery of exhaustible capacity; and
the determination of the first clock frequency is a determination to lower the cock rate of the first programmable data processing unit in response to a determination that an energy reserve of the battery is low.

16. The method of claim 1, wherein each of the plurality of clock multipliers is programmable for setting a plurality of the plurality of implementable clock frequencies at different times.

* * * * *